(12) United States Patent
Ishida et al.

(10) Patent No.: US 6,752,932 B2
(45) Date of Patent: Jun. 22, 2004

(54) FERRITE CORE AND ITS PRODUCTION METHOD

(75) Inventors: Shigetoshi Ishida, Tokyo (JP); Masahiko Watanabe, Tokyo (JP); Katsushi Yasuhara, Tokyo (JP)

(73) Assignee: TDK Corporation, Tokyo (JP)

( * ) Notice: Subject to any disclaimer, the term of this patent is extended or adjusted under 35 U.S.C. 154(b) by 5 days.

(21) Appl. No.: 10/222,781

(22) Filed: Aug. 19, 2002

(65) Prior Publication Data

US 2003/0042470 A1 Mar. 6, 2003

(30) Foreign Application Priority Data

Aug. 20, 2001 (JP) ........................................ 2001-249089
Jul. 30, 2002 (JP) ........................................ 2002-221777

(51) Int. Cl.$^7$ .......................... H01F 1/034; C01G 49/00
(52) U.S. Cl. ................................................... 252/62.62
(58) Field of Search ...................................... 252/62.62

(56) References Cited

U.S. PATENT DOCUMENTS 6,391,222 B1 * 5/2002 Watanabe ................ 252/62.59

FOREIGN PATENT DOCUMENTS

| DE | 25 06 338 |   | 8/1976 |
| DE | 2506338 | * | 8/1976 |
| JP | 63-59241 |   | 11/1988 |
| JP | 63-59242 |   | 11/1988 |
| JP | 2-83218 | * | 3/1990 |
| JP | 7-70385 |   | 7/1995 |
| JP | 10-64715 | * | 3/1998 |
| JP | 2865784 |   | 12/1998 |
| JP | 10-326706 |   | 12/1998 |

OTHER PUBLICATIONS

S. H. Chen, et al., Journal of Magnetism and Magnetic Materials, vol. 209, No. 1–3, pp. 193–196, XP–004184613, "The Influence of Grain Boundary Internal Stress on Permeability: Temperature Curve for $M_N$–$Z_N$ Ferrites", Feb. 2000.

* cited by examiner

Primary Examiner—C. Melissa Koslow
(74) Attorney, Agent, or Firm—Oblon, Spivak, McClelland, Maier & Neustadt, P.C.

(57) ABSTRACT

A ferrite core is provided. This ferrite core has high saturation flux density Bs at a high temperature of 100° C. or higher, and in particular, at around 150° C., and has excellent magnetic stability at a high temperature, experiencing reduced deterioration of magnetic properties, and in particular, reduced core loss at such high temperature (even by trading off some improvement in the level of the loss). The ferrite core of the invention contains 55 to 59 mol % of iron oxide calculated in terms of $Fe_2O_3$, more than 0 to 15 mol % of zinc oxide calculated in terms of ZnO, 2 to 10 mol % of nickel oxide calculated in terms of NiO, and the balance of manganese oxide (MnO) as its main components, and when the main components has a composition represented by the formula:

$$(Zn^{2+}{}_a, Ni^{2+}{}_b, Mn^{2+}{}_c, Mn^{3+}{}_d, Fe^{2+}{}_e, Fe^{3+}{}_f)O_{4+\delta} \quad (1)$$

wherein a, b, c, d, e and f meet the relations:

$$a+b+c+d+e+f=3, \text{ and}$$

$$\delta = a+b+c+(3/2)d+e+(3/2)f-4$$

the value of $\delta$ in formula (1) is such that:

$$0 \leq \delta \leq 2.5 \times 10^{-3}.$$

17 Claims, No Drawings

FERRITE CORE AND ITS PRODUCTION METHOD

BACKGROUND OF THE INVENTION

This invention relates to a ferrite core which is adapted for use in a transformer or a choke coil used at a high temperature, and its production method. To be more specific, this invention relates to a ferrite core which exhibits a high saturation flux density at a high temperature of 100° C. or higher, and in particular, at a temperature around 150° C., and which has high magnetic stability with reduced deterioration in high temperature storage, as well as its production method.

A soft ferrite which is used in producing a magnetic core should have a high saturation flux density and a low power loss. Such ferrite can be used as a ferrite core in a transformer or a choke coil of a DC—DC converter in an EV (electric vehicle) or HEV (hybrid electric vehicle), or as a ferrite core to be placed near the engine of an automobile which will be exposed to a high temperature.

Various properties are required for such soft ferrite core which is used at a high temperature. Exemplary such properties include excellent durability with reduced magnetic deterioration during use at a high temperature, the saturation flux density which experience no significant decrease at a high temperature, and low power loss.

Various proposals have been made to fulfill such requirements. For example, JP-A 10-64715 proposes a magnetic core material of low loss ferrite comprising a MnZnNi ferrite in order to provide a ferrite magnetic core material which exhibits a low loss and a high saturation flux density for a relatively broad frequency band of about 100 kHz to 500 kHz.

The magnetic core material of MnZnNi ferrite disclosed in JP-A 10-64715, however, was still insufficient in the saturation flux density Bs and loss at a high temperature of 100° C. or higher, and in particular, at around 150° C. as well as in the magnetic stability although it had sufficiently high saturation flux density Bs and sufficiently low loss at 80° C.

JP-A 2-83218 also proposes an oxide magnetic material of MnZnNi ferrite. This material has been developed to provide a material which has highly stable magnetic properties, high saturation flux density, and low power loss when used at a high temperature range of 100° C. or higher, and in particular, at 100 to 200° C. at magnetic field strength (flux density) of 1000 G (100 mT) or higher, and in particular, at 2000 to 5000 G (200 to 500 mT) or higher. In JP-A 2-83218, additives incorporated as auxiliary components are particularly defined. The material disclosed in JP-A 2-83218 exhibits dramatically improved saturation flux density in view of the state of the art at that time. However, there is an increasing demand for improving the properties of the material, and further improvements are required. In addition, despite the effectiveness of the $Fe_2O_3$ rich composition of this material in attaining the high saturation flux density, it is quite unlikely that deterioration of the magnetic properties at a high temperature can be effectively avoided as in the case of JP-A 2-83218 in the highly $Fe_2O_3$ rich region not tested in JP-A 2-83218 by merely limiting the content of the auxiliary components (additives) to predetermined ranges.

SUMMARY OF THE INVENTION

An object of the present invention is to obviate the situation as described above, and to provide a ferrite core which has high saturation flux density Bs at a high temperature of 100° C. or higher, and in particular, at around 150° C., and which has excellent magnetic stability at a high temperature, experiencing reduced deterioration of magnetic properties, and in particular, reduced core loss at such high temperature (even by trading off some improvement in the level of the loss).

Such an object is achieved by the present invention as defined below.

(1) A ferrite core containing 55 to 59 mol % of iron oxide calculated in terms of $Fe_2O_3$, more than 0 to 15 mol % of zinc oxide calculated in terms of ZnO, 2 to 10 mol % of nickel oxide calculated in terms of NiO, and the balance of manganese oxide (MnO) as its main components, wherein when the main components has a composition represented by the formula:

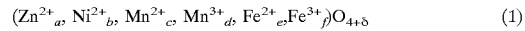

$$(Zn^{2+}{}_a, Ni^{2+}{}_b, Mn^{2+}{}_c, Mn^{3+}{}_d, Fe^{2+}{}_e, Fe^{3+}{}_f)O_{4+\delta} \quad (1)$$

wherein a, b, c, d, e and f meet the relations:

$a+b+c+d+e+f=3$, and $\delta=a+b+c+(3/2)d+e+(3/2)f-4$ the value of $\delta$ in formula (1) is such that:

$0 \leq \delta \leq 2.5 \times 10^{-3}$.

(2) A ferrite core according to the above (1) wherein $0 \leq \delta \leq 2.0 \times 10^{-3}$.

(3) A ferrite core according to the above (1) wherein $0 \leq \delta \leq 1.0 \times 10^{-3}$.

(4) A ferrite core according to the above (1) wherein $0 \leq \delta \leq 0.5 \times 10^{-3}$.

(5) A ferrite core according to the above (1) wherein $0 < \delta$.

(6) A ferrite core according to the above (1) containing 56 to 57 mol % of iron oxide calculated in terms of $Fe_2O_3$, 5 to 10 mol % of zinc oxide calculated in terms of ZnO, 3 to 6 mol % of nickel oxide calculated in terms of NiO, and the balance of manganese oxide (MnO) as its main components.

(7) A ferrite core according to the above (1) which has a saturation flux density at 100° C. of at least 430 mT, and a saturation flux density at 150° of at least 350 mT when measured by applying a magnetic field of 1000 A/m, and a core loss at 100° C. of up to 1200 kW/m³ when measured by applying a sine-wave AC magnetic field of 100 kHz and 200 mT.

(8) A ferrite core according to the above (1) which has a saturation flux density at 100° C. of at least 450 mT, and a saturation flux density at 150° of at least 380 mT when measured by applying a magnetic field of 1000 A/m, and a core loss at 100° C. of up to 900 kW/m³ when measured by applying a sine-wave AC magnetic field of 100 kHz and 200 mT.

(9) A ferrite core according to the above (1) wherein increase in the core loss is up to 4% when stored at 150° C. for 2000 hours.

(10) A ferrite core according to the above (1) wherein increase in the core loss is up to 3% when stored at 150° C. for 2000 hours.

(11) A ferrite core according to the above (1) wherein increase in the core loss is up to 10% when stored at 175° C. for 2000 hours.

(12) A ferrite core according to the above (1) wherein increase in the core loss is up to 50% when stored at 200° C. for 2000 hours.

(13) A method for producing the ferrite core of the above (1) comprising the step of firing a molded article, wherein the firing step comprises heating stage, steady temperature stage, and cooling stage in this order, and the article is kept in the steady temperature stage at a temperature (steady temperature) of at least 1250° C. with the oxygen concentration of the atmosphere kept at 0.05 to 2.0%.

(14) A method for producing the ferrite core according to the above (13) wherein the oxygen concentration of the atmosphere in the steady temperature stage is kept at 0.05 to 0.8%.

(15) A method for producing the ferrite core according to the above (13) wherein the temperature (steady temperature) in the steady temperature stage is up to 1400° C.

(16) A method for producing a ferrite core according to the above (13) wherein the cooling stage is accomplished such that, when a specific temperature in 900 to 1200° C. is designated Tn, and when the temperature is reduced from the steady temperature to the temperature Tn, the oxygen concentration $P_{O_2}$ (unit: %) of the atmosphere at temperature T (unit: K) is either gradually or incrementally reduced to satisfy the relation:

$$\text{Log}(P_{O_2}) = a - b/T$$

wherein a is 3 to 14, and b is 5000 to 23000, provided that a and b may or may not alter with the decrease in the temperature T;

when the temperature reaches Tn, the oxygen concentration of the atmosphere is reduced to the level of 0 to 0.01%; and the temperature is reduced from Tn to the room temperature at a cooling rate which is 2 to 10 times faster than the cooling rate used in the cooling from the steady temperature to the temperature Tn.

(17) A method for producing a ferrite core according to the above (16) wherein the temperature is reduced from the steady temperature to the temperature Tn at a cooling rate of 20 to 200° C./hr.

(18) A method for producing a ferrite core according the above (13) wherein, in the temperature range of 900° C. to the steady temperature in the heating stage, the oxygen concentration in the atmosphere is maintained to 10% or less, and the heating rate is maintained to 50 to 300° C./hr.

DETAILED DESCRIPTION OF THE INVENTION

Next, the MnZnNi ferrite core of the present invention is described in detail.

The substantial component of the ferrite core of the present invention is constituted by the main components comprising 55 to 59 mol %, and preferably 56 to 57 mol % of iron oxide calculated in terms of $Fe_2O_3$, more than 0 to 15 mol %, and preferably 5 to 10mol % of zinc oxide calculated in terms of ZnO, 2 to 10 mol %, and preferably 3 to 6 mol % of nickel oxide calculated in terms of NiO, and the balance of manganese oxide (MnO). In determining the content of various oxides in the main components, the manganese oxide constituting the balance of the main component is calculated in terms of MnO.

When the content of $Fe_2O_3$ is too low in the composition as described above, saturation flux density at high temperatures will be reduced. On the other hand, when the $Fe_2O_3$ content is too high, improvement of the core loss becomes difficult, and control of the value of δ as described below will be difficult rendering the suppression of the increase in the core loss difficult.

When ZnO is completely absent, decrease in the so called "relative density" is found, and improvement of the core loss becomes difficult. When the ZnO content is too high, saturation flux density at high temperatures tends to become reduced with the decrease in the Curie temperature.

When the NiO content is too low, it becomes difficult to provide the ferrite with a high flux density and low loss at high temperatures. When the NiO content is too high, improvement of the core loss becomes difficult.

The ferrite core of the present invention may further comprise various known auxiliary components in addition to the main components as described above.

Exemplary auxiliary components and their desirable contents are, $SiO_2$: 0.005 to 0.03 mass %,
CaO: 0.008 to 0.17 mass %,
$Nb_2O_5$: 0.005 to 0.03 mass %,
$Ta_2O_5$: 0.01 to 0.08 mass %,
$V_2O_5$: 0.01 to 0.1 mass %,
$ZrO_2$: 0.005 to 0.03 mass %,
$Bi_2O_3$: 0.005 to 0.04 mass %, and
$MoO_3$: 0.005 to 0.04 mass %.

These auxiliary components may be incorporated either alone or in combination of two or more.

Among these, $SiO_2$ and CaO are the most preferred. When the content of $SiO_2$ is less than 0.005 mass %, or the content of the CaO is less than 0.008 mass %, the resulting ferrite will suffer from reduced electric resistance, and hence, increased power loss. When the $SiO_2$ content is in excess of 0.03 mass %, or the CaO content is in excess of 0.17 mass %, abnormal grain growth will take place in the firing, and it will be difficult to obtain the desired saturation flux density Bs and the low power loss.

In the present invention, when the main components of the ferrite core are represented by the ferrite compositional formula (1), below:

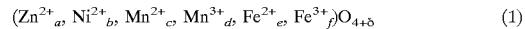

$$(Zn^{2+}{}_a, Ni^{2+}{}_b, Mn^{2+}{}_c, Mn^{3+}{}_d, Fe^{2+}{}_e, Fe^{3+}{}_f)O_{4+\delta} \quad (1)$$

wherein a, b, c, d, e and f meet the relations:

$$a+b+c+d+e+f=3, \text{ and}$$

$$\delta = a+b+c+(3/2)d+e+(3/2)f-4$$

the value of δ (amount of excessive oxygen or cation vacancies) in the formula (1) is such that $\delta \leq 2.5 \times 10^{-3}$, preferably $\delta \leq 2.0 \times 10^{-3}$, more preferably, $\delta \leq 1.0 \times 10^{-3}$, and most preferably $\delta \leq 0.5 \times 10^{-3}$.

When the value of δ is too large, it is highly likely that stability of the magnetic properties at high temperatures becomes insufficient, and in particular, increase in the core loss and decrease initial permeability μi at a temperature higher than the secondary peak temperature of the ferrite become significant. It is to be noted that the value of δ may be equal to zero. However, when the firing conditions are controlled such that the δ value is zero, it will then be difficult to realize the desired magnetic properties in a stable manner, and the δ value is preferably larger than zero.

The value of δ is calculated from the results of analysis of the composition and quantitative analysis of $Fe^{2+}$ and $Mn^{3+}$.

The composition was analyzed by pulverizing MnZnNi ferrite sintered body, and evaluating the MnZnNi ferrite powder with an X-ray fluorescence analyzer (for example, Simultix 3530 manufactured by Rigaku) by glass bead method.

The $Fe^{2+}$ and $Mn^{3+}$ were quantitatively analyzed by pulverizing the MnZnNi ferrite sintered body, dissolving the resulting powder in an acid, and thereafter conducting potentiometric titration using $K_2Cr_2O_7$ solution.

With regard to the $Ni^{2+}$ and $Zn^{2+}$, the content was calculated by assuming that all of the Ni and Zn found in the analysis of the composition were present as divalent ions. The amounts of the $Fe^{3+}$ and $Mn^{2+}$ were assumed to be the values obtained by subtracting the amounts of $Fe^{2+}$ and $Mn^{3+}$ determined by the potentiometric titration from the amounts of the Fe and Mn determined in the analysis of the composition.

The value of δ was calculated by using the values obtained as described above so that the relations:

$a+b+c+d+e+f=3$, and $δ=a+b+c+(3/2)d+e+(3/2)f-4$ are simultaneously satisfied.

The ferrite core of the present invention is produced by firing the article molded from the powder of starting materials as in the case of conventional ferrite cores. The powder of starting materials may be produced either by calcining the starting materials, or by directly roasting the starting materials with no calcination step.

It might be extremely difficult to completely clarify the conditions required for confining the value of δ within the range as defined above. The inventors of the present invention, however, have confirmed through experiments that the value of δ can be regulated within the range as defined above by adequately controlling the parameters as described below.

(1) Composition of the Main Component

The composition of the main component is preferably limited to the composition as described above.

(2) Firing Conditions

The firing step is preferably accomplished by heating stage, steady temperature stage, and cooling stage which are conducted in this order.

(i) Heating Stage

At the temperature preferably in the range of 900° C. to the steady temperature, and more preferably, at the temperature in the range of 600° C. to steady temperature, the oxygen concentration of the atmosphere is preferably controlled to 10% or less, and more preferably to 3% or less, and the heating rate is preferably controlled to 50 to 300° C./hr, and more preferably to 50 to 150° C./hr. The control of heating conditions in the heating stage does not significantly affect to the control of the δ value. The control of the heating conditions, however, results in the production of a compact ferrite core, and hence, in an improved saturation flux density with a reduced core loss.

It is to be noted that, at a temperature lower than the temperature range as specified above, the oxygen concentration may exceed the range as specified above, and may be equivalent to the oxygen concentration in the air.

(ii) Steady Temperature Stage

The temperature is maintained at an adequately selected steady temperature of about 1250 to 1400° C. The firing atmosphere used is a relatively oxygen-poor atmosphere which has never been employed in the art, and to be more specific, the firing atmosphere has an oxygen concentration of 0.05 to 2.0%, and preferably 0.05 to 0.8%.

The cooling stage is accomplished such that, when a specific temperature in 900 to 1200° C. is designated Tn, and the temperature is reduced from the steady temperature to the temperature Tn, the oxygen concentration of the atmosphere $P_{O_2}$ (unit: %) at temperature T (unit: K) is either gradually or incrementally reduced to satisfy the relation:

$Log(P_{O_2})=a-b/T$, and when the temperature reaches Tn, the oxygen concentration of the atmosphere is reduced to the level of 0 to 0.01%, and preferably 0 to 0.001%. In the above equation, a is preferably 3 to 14, more preferably 5 to 13, and most preferably 7 to 11; and b is preferably 5000 to 23000, more preferably 8000 to 21000, and most preferably 11000 to 19000.

When the oxygen concentration $PO_2$ is continuously reduced with the decrease in the temperature T, a and b may be typically set at a particular value, respectively. On the other hand, when the oxygen concentration $PO_2$ is incrementally reduced with the decrease in the temperature T, a and/or b may be altered, in the temperature range wherein the $PO_2$ is to be maintained at the constant value, so that a−b/T remains at a constant value. In other words, a and b may be either altered in accordance with the decrease in the temperature T, or kept at constant values irrespective of the decrease in the temperature T. When the oxygen concentration is incrementally reduced, the temperature range wherein the oxygen concentration is to be maintained at the constant value preferably does not exceed 100° C. When the temperature range wherein the oxygen concentration is to be maintained at the constant value is too broad, the merit of reducing the oxygen concentration with the decrease in the temperature will be less significant. The specific values for a and b may adequately determined to thereby obtain the best results.

The temperature is reduced from the steady temperature to the temperature Tn preferably at a cooling rate of 20 to 200° C./hr, and in particular, at 40 to 150° C./hr. On the other hand, the temperature is reduced from Tn to the room temperature at a cooling rate which is 2 to 10 times faster than the cooling rate used in the cooling from the steady temperature to the temperature Tn.

The decrease in the oxygen concentration from the steady temperature to the temperature Tn may be accomplished by reducing the ratio of the oxygen gas or the air mixed in the gas other than the oxygen (nitrogen gas, inert gas, or the like), and the ratio of the oxygen gas or the air mixed is typically reduced to zero at temperature Tn. As a matter of fact, the oxygen concentration will not be reduced exactly to zero due to the inevitably remaining or generating oxygen gas even when the ratio of the oxygen gas or air the mixed were reduced to zero. However, the δ value will not be significantly affected by the oxygen remaining at the concentration as low as about 0.01% at the temperature lower than the temperature Tn due to the increased cooling rate in such temperature range.

The temperature Tn may be adequately determined to thereby obtain the best results.

With regard to the atmosphere used in the heating stage, the steady temperature stage and the cooling stage, it is preferable that the gas constituting the atmosphere other than the oxygen substantially comprises nitrogen or an inert gas.

Other conditions which are preferably employed in the present invention are described below in further detail.

The firing temperature (steady temperature) used may be at least 1250° C., preferably up to 1400° C., and more preferably 1300 to 1360° C., and the oxygen concentration used in the steady temperature stage in the firing is as described above. When the firing temperature is less than 1250° C., sintering density will be unduly low, and as a consequence, the product will suffer from a low saturation flux density and an increased core loss. On the other hand, an excessively high firing temperature is likely to invite abnormal grain growth and an increased core loss. In addition, when the oxygen concentration in the steady temperature stage in the firing is too high, increase in the core loss during the high temperature storage will be increased. Although the oxygen concentration in the steady temperature stage may be reduced to 0% in view of suppressing the increase of the core loss, it will then be difficult to obtain the desired electromagnetic properties at such an extremely low oxygen concentration in the steady temperature stage, and the core loss will be particularly increased. Therefore, the oxygen concentration is preferably not reduced beyond the range as specified above.

It is to be noted that, in the present invention, the firing time (the time of the steady temperature stage) used may be substantially the same as the one used in the conventional ferrite production process, and most typically 2 to 10 hours. The conditions employed in the steps of calcination, roasting, molding, and the like may also be similar to those employed in the conventional ferrite production process. For example, the pressure used in the molding may be 48 to 196 MPa.

The ferrite core of the present invention exhibits excellent magnetic properties at a high temperature. To be more specific, the ferrite core of the present invention exhibits a saturation flux density at 100° C. of 430 mT or more, or 450 mT or more, or even 455 mT or more, a saturation flux density at 150° C. of 350 mT or more, or 380 mT or more, or even 385 mT or more when measured by applying a magnetic field of 1000 A/m, and a core loss at 100° C. of 1200 kW/m$^3$ or less, or 900 kW/m$^3$ or less, or even 750 kW/m$^3$ or less when measured at 100 kHz, 200 mT.

The ferrite core of the present invention also exhibits an increase in the core loss of up to 4%, or up to 3%, or even up to 1% when stored at 150° C. for 2000 hours, an increase in the core loss of up to 10%, or even up to 5% when stored at 175° C. for 2000 hours, and an increase in the core loss of up to 50%, or up to 40%, or even up to 30% when stored 200° C. for 2000 hours.

EXAMPLES

Next, the present invention is described in further detail by referring to the Examples.

Example 1

The ferrite core samples shown in Table 1 were produced by the procedure as described below.

The materials for the main components were prepared to comply with the composition shown in the Table 1, wet mixed, and after drying with a spray dryer, calcined at 900° C. for 2 hours.

The materials for the main components were prepared to comply with the composition shown in the Table 1, wet mixed, and after drying with a spray dryer, calcined at 900° C. for 2 hours.

The mixing was accomplished by adding the auxiliary component materials to the calcined main component materials, and pulverizing the mixture until mean particle diameter of the calcined materials was 1.5 μm.

PVA (polyvinyl alcohol) functioning as a binder was added to the resulting mixture, and the mixture was granulated by using a spray dryer. The powder was molded by applying a pressure of 98 MPa (1 ton/cm$^2$) to thereby produce a toroidal magnetic core sample.

The resulting toroidal magnetic core sample was fired under the conditions as specified below. It is to be noted that, in the heating stage, steady temperature stage, and cooling stage, the gas other than the oxygen constituting the atmosphere was nitrogen.

In the heating stage, the temperature was raised from room temperature (R.T.) to 900° C. at a rate of 300° C./hr, and from 900° C. to the steady temperature at a rate of 100° C./hr. The oxygen concentration in the atmosphere was controlled so that the oxygen concentration was up to 3% at the temperature of 600° C. or higher.

In the steady temperature stage, the temperature was kept at the steady temperature of 1300° C. for 5 hours. In the production of the samples of the invention, the oxygen concentration in the steady temperature stage was selected from the range of 0.05 to 2.0%.

In the cooling stage, the temperature was reduced from the steady temperature to 1000° C. at a rate (cooling rate) of 50° C./hr, with the oxygen concentration controlled such that the oxygen concentration $P_{O_2}$ (unit: %) at temperature T (unit: K) meets $$\mathrm{Log}(P_{O_2}) = a - b/T$$

wherein a is a particular value in the range of 7 to 11, and b is a particular value in the range of 11000 to 19000. The temperature was reduced from 1000° C. at a rate of 300° C./hr with the oxygen concentration of the atmosphere maintained at 0.01% or less.

The samples were measured for the value of the core loss (power loss) Pcv, increase in the Pcv during storage at a high temperature, saturation flux densities Bs 100 and Bs 150 at 100° C. and 150° C., and the value of δ by the procedure as described below.

(1) Core Loss Pcv

Core loss at 100° C. was measured with a B-H analyzer by applying a sine-wave AC magnetic field at 100 kHz and 200 mT (maximum value).

(2) Increase (%) in Core Loss $P_{CV}$

The samples were stored in an atmosphere of 150° C. for 2000 hours, and measured for the core loss before and after the storage. The core loss before the storage was designated $P_{cvb}$, and the core loss after the storage was designated $P_{cva}$. Increase (%) in the core loss was calculated by the equation:

Increase (%) in the core loss=$100(P_{cva}-P_{cvb})/P_{cvb}$ (unit: %)

(3) Saturation Flux Densities Bs 100 and Bs 150

Saturation flux densities Bs 100 and Bs 150 at 100° C. and 150° C. were measured with a B-H tracer, respectively, by applying a magnetic field of 1000 A/m.

(4) Value of δ

The value of δ was calculated from the results of analysis of the composition and quantitative analysis of $Fe^{2+}$ and $Mn^{3+}$. To be more specific, the composition was analyzed by pulverizing MnZnNi ferrite sintered body, and evaluating the MnZnNi ferrite powder with an X-ray fluorescence analyzer (Simultix 3530 manufactured by Rigaku) by glass bead method.

The $Fe^{2+}$ and $Mn^{3+}$ were quantitatively analyzed by pulverizing the MnZnNi sintered body, dissolving the resulting powder in an acid, and thereafter conducting potentiometric titration using $K_2Cr_2O_7$ solution.

With regard to the $Ni^{2+}$ and $Zn^{2+}$, it was assumed that all of the Ni and Zn found in the analysis of the composition were present as divalent ions. The amounts of the $Fe^{3+}$ and $Mn^{2+}$ were assumed to be the values obtained by subtracting the amounts of $Fe^{2+}$ and $Mn^{3+}$ determined by the potentiometric titration from the amounts of the Fe and Mn determined in the analysis of the composition.

The value of δ was calculated by using the values obtained as described above so that the relations:

$a+b+c+d+e+f=3$, and $\delta=a+b+c+(3/2)d+e+(3/2)f-4$ are satisfied in the formula (1).

The results are shown in Table 1.

Decrease in the saturation flux density at 100° C. and 150° C. was found in the case of Comparative Examples wherein content of the iron oxide was too low, while increase in the core loss was found in the case of Comparative Examples wherein content of the iron oxide was too high.

Increase in the core loss was found when no zinc oxide content was present, while decrease in the saturation flux density at 100° C. and 150° C. was found when the zinc oxide content was too high.

High saturation flux density and low core loss could not be simultaneously attained at high temperatures when the nickel oxide content was too low. Increase in the core loss was also found when the nickel oxide content was too high.

Increase in the core loss during the high temperature storage became noticeable when the value of δ is in excess of $2.5 \times 10^{-3}$.

It is to be noted that Sample No. 120 (Comparative Example) of Table 1 has the same composition of the main components as Sample No. 106 (Example of the present invention). However, the value of δ is outside the scope of the present invention in the case of the Sample No. 120 since

TABLE 1

| Sample No. | Main Components (mol %) | | | | δ value ($\times 10^{-3}$) | Increase in Pvc when stored at 150° C. (%) | Pcv at 100° C. ($kW/m^3$) | Bs150 (mT) | Bs100 (mT) |
|---|---|---|---|---|---|---|---|---|---|
| | $Fe_2O_3$ | MnO | ZnO | NiO | | | | | |
| 101 | 58.1 | 23.8 | 11.6 | 6.5 | 0.9 | 1.2 | 954 | 371 | 448 |
| 102 | 57.2 | 39.19 | 0.01 | 3.6 | 1.4 | 2.8 | 872 | 407 | 445 |
| 103 | 56.3 | 41.39 | 0.01 | 2.3 | 0.7 | 0.9 | 763 | 396 | 439 |
| 104 | 58.5 | 31.99 | 0.01 | 9.5 | 2.2 | 1.2 | 1155 | 431 | 461 |
| 105 | 57.0 | 31.9 | 6.2 | 4.9 | 1.0 | 3.0 | 836 | 400 | 465 |
| 106 | 56.5 | 28.9 | 10.0 | 4.6 | 0.8 | 3.0 | 593 | 385 | 455 |
| 107 | 56.0 | 34.6 | 5.8 | 3.6 | 0.7 | 1.0 | 421 | 381 | 459 |
| 108 | 55.2 | 26.1 | 14.5 | 4.2 | 1.5 | 3.7 | 587 | 364 | 435 |
| 109 | 55.3 | 36.4 | 6.0 | 2.3 | 0.4 | 0.5 | 398 | 379 | 455 |
| 110 | 55.1 | 33.9 | 8.2 | 2.8 | 0.3 | 0.3 | 372 | 371 | 457 |
| 111 (Comp.) | 61.2* | 28.8 | 4.5 | 5.5 | 4.5* | 5.6* | 2226* | 402 | 468 |
| 112 (Comp.) | 54.2* | 28.9 | 14.8 | 2.1 | 0.3 | 0.6 | 674 | 243* | 360* |
| 113 (Comp.) | 52.5* | 45.5 | 0* | 2.0 | 0.2 | 0.2 | 1201* | 322* | 354* |
| 114 (Comp.) | 55.2 | 26.5 | 16.1* | 2.2 | 0.8 | 1.5 | 1354* | 277* | 383* |
| 115 (Comp.) | 56.0 | 14.2 | 10.0 | 19.8* | 1.5 | 1.6 | 3576* | 385 | 421* |
| 116 (Comp.) | 57.2 | 39.7 | 2.0 | 1.1* | 1.6 | 1.8 | 1984* | 396 | 445 |
| 117 (Comp.) | 58.2 | 21.0 | 7.6 | 13.2* | 1.9 | 2.1 | 1836* | 405 | 469 |
| 118 (Comp.) | 56.2 | 32.2 | 0* | 11.6* | 0.5 | 0.9 | 2365* | 407 | 432 |
| 119 (Comp.) | 53.5 | 35.5 | 11.0 | 0* | 2.1 | 2.3 | 295 | 311* | 395* |
| 120 (Comp.) | 56.5 | 28.9 | 10.0 | 4.6 | 3.1* | 5.1* | 501 | 379 | 450 |

*outside the scope of the invention, or insufficient properties

As evident from Table 1, the Examples of the present invention exhibits high saturation flux density at 100° C. and 150° C. as well as reduced core loss, and furthermore, reduced increase in the core loss during the high temperature storage. To be more specific, the ferrite core samples of the present invention exhibited a core loss $P_{CV}$ of 1200 $kW/m^3$ or less, increase in the core loss $P_{cv}$ of 4.0% or less, a Bs 100 of 430 mT or more, and a Bs 150 of 350 mT or higher. When initial permeability μi was measured before and after the high temperature storage to calculate the decrease in the initial permeability μi, the samples of the present invention were also found to exhibit smaller decrease in the initial permeability μi.

In contrast, a considerable increase in the core loss $P_{cv}$ was found in the case of Comparative Examples wherein the value of δ was in excess of $2.5 \times 10^{-3}$.

the oxygen concentration employed in the steady temperature stage was 6%.

Example 2

The ferrite core samples shown in Table 2 were produced by repeating the procedure of Example 1 except that the steady temperature in the firing and the oxygen concentration in the steady temperature stage used were as shown in Table 2.

The resulting samples were evaluated for their properties as in the case of Example 1 except that the core loss Pcv were measured by storing at 150° C. for 2000 hours, 175° C. for 2000 hours, and 200° C. for 2000 hours.

The results are shown in Table 2.

TABLE 2

| Sample No. | Main Components (mol %) | | | | Firing Conditions | | δ value (×10⁻³) | Bs100 (mT) | Bs150 (mT) | Pcv at 100° C. (kW/m³) | Increase in Pcv in storage (%) | | |
|---|---|---|---|---|---|---|---|---|---|---|---|---|---|
| | Fe$_2$O$_3$ | MnO | ZnO | NiO | Temp. (° C.) | PO$_2$ (%) | | | | | 150° C. | 175° C. | 200° C. |
| 201 | 56.5 | 29.0 | 9.5 | 5.0 | 1350 | 0.3 | 0.1 | 455 | 385 | 650 | 0.2 | 3.0 | 25 |
| 202 | 56.0 | 34.5 | 6.0 | 3.5 | 1320 | 0.5 | 0.3 | 460 | 380 | 600 | 1.0 | 5.0 | 40 |
| 203 | 56.5 | 29.0 | 10.0 | 4.5 | 1300 | 0.8 | 0.9 | 450 | 380 | 550 | 2.9 | 9.0 | 45 |
| 204 | 56.0 | 36.0 | 5.0 | 3.0 | 1280 | 0.2 | 0.8 | 450 | 390 | 750 | 2.5 | 8.5 | 43 |
| 205 | 57.0 | 34.5 | 5.0 | 3.5 | 1320 | 0.3 | 0.8 | 450 | 405 | 850 | 2.8 | 8.5 | 46 |
| 206 | 57.0 | 27.0 | 10.0 | 6.0 | 1300 | 0.3 | 0.7 | 450 | 380 | 880 | 2.1 | 7.9 | 42 |
| 207 | 57.5* | 31.5 | 6.0 | 5.0 | 1350 | 0.3 | 1.5* | 465 | 400 | 950 | 4.0 | 15 | 60** |
| 208 (Comp.) | 56.5 | 29.0 | 9.5 | 5.0 | 1350 | 20.8** | 15.0** | 440 | 375 | 1150 | 25.0** | 88.0** | 185** |
| 209 | 56.5 | 29.0 | 9.5 | 5.0 | 1200* | 0.5 | 0.8 | 430 | 370 | 930 | 2.5 | 8.5 | 52** |
| 210 | 55.5* | 34.0 | 8.0 | 2.5* | 1300 | 0.5 | 0.8 | 445 | 365 | 450 | 2.1 | 7.6 | 41 |
| 211 | 56.0 | 34.0 | 4* | 6.5* | 1320 | 1.0* | 1.4* | 460 | 380 | 920 | 4.0 | 13** | 58** |
| 212 | 57.0 | 26.0 | 11.0* | 6.0 | 1300 | 0.9* | 1.2* | 440 | 360 | 750 | 3.5 | 10.5** | 51** |

**outside the scope of the invention, or insufficient properties
*outside the preferable range The results in Table 2 reveal that further improvements with regard to the saturation flux density at high temperatures, the core loss, and the increase in the core loss can be realized by limiting the composition of the main components and the value of δ to the preferable ranges as described above.

As described above, the ferrite core of the present invention has high saturation flux density at 100° C. and 150° C. as well as reduced core loss, and experiences reduced increase in the core loss in the high temperature storage. Therefore, the ferrite core of the invention has the properties required for the ferrite core used in a transformer or a choke coil of a DC—DC converter in an EV (electric vehicle) or HEV (hybrid electric vehicle) which will be used at a high temperature, or a ferrite core to be placed near an automobile engine which will also be exposed to a high temperature.

With regard to the improvement of the magnetic properties in the high temperature region, in particular, the suppression of the increase of the core loss in the storage at a high temperature of 150° C. or more, it is believed that such improvement may be ascribed at least partly to the suppression of the value of δ (cation vacancies) to the level below a certain value by limiting the composition of the ferrite as well as the temperature and the oxygen concentration used in the production.

MERIT OF THE INVENTION

As described above, the present invention has enabled to provide a ferrite core which has high saturation flux density at 100° C. and 150° C. as well as reduced core loss, and which experiences reduced increase in the core loss in the high temperature storage.

As a consequence, the ferrite core of the present invention is well adapted for use as a ferrite core in a transformer or a choke coil of a DC—DC converter in an EV (electric vehicle) or HEV (hybrid electric vehicle) which will be used at a high temperature, or as a ferrite core to be placed near an automobile engine which will also be exposed to a high temperature.

Japanese Patent Application Nos. 2001-249089 and 2002-221777 are incorporated herein by reference.

What is claimed is:
1. A ferrite core containing 55 to 59 mol % of iron oxide calculated in terms of Fe$_2$O$_3$, more than 0 to 15 mol % of zinc oxide calculated in terms of ZnO, 2 to 10 mol % of nickel oxide calculated in terms of NiO, and the balance of manganese oxide (MnO) as its main components, wherein when the main components has a composition represented by the formula:

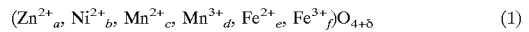

$$(Zn^{2+}{}_a, Ni^{2+}{}_b, Mn^{2+}{}_c, Mn^{3+}{}_d, Fe^{2+}{}_e, Fe^{3+}{}_f)O_{4+\delta} \quad (1)$$

wherein a, b, c, d, e and f meet the relations:

$$a+b+c+d+e+f=3, \text{ and}$$

$$\delta = a+b+c+(3/2)d+e+(3/2)f-4$$

the value of δ in formula (1) is such that:

$$0<\delta \leq 2.5 \times 10^{-3}.$$

2. A ferrite core according to claim 1 wherein $$0<\delta \leq 2.0 \times 10^{-3}.$$

3. A ferrite core according to claim 1 wherein $$0<\delta \leq 1.0 \times 10^{-3}.$$

4. A ferrite core according to claim 1 wherein $$0<\delta \leq 0.5 \times 10^{-3}.$$

5. A ferrite core according to claim 1 containing 56 to 57 mol % of iron oxide calculated in terms of Fe$_2$O$_3$, 5 to 10 mol % of zinc oxide calculated in terms of ZnO, 3 to 6 mol % of nickel oxide calculated in terms of NiO, and the balance of manganese oxide (MnO) as its main components.

6. A ferrite core according to claim 1 which has
 a saturation flux density at 100° C. of at least 430 mT, and
  a saturation flux density at 150° of at least 350 mT when measured by applying a magnetic field of 1000 A/m, and
 a core loss at 100° C. of up to 1200 kW/m³ when measured by applying a sine-wave AC magnetic field of 100 kHz and 200 mT.

7. A ferrite core according to claim 1 which has
 a saturation flux density at 100° C. of at least 450 mT, and
  a saturation flux density at 150° of at least 380 mT when measured by applying a magnetic field of 1000 A/m, and a core loss at 100° C. of up to 900 kW/m$^3$ when measured by applying a sine-wave AC magnetic field of 100 kHz and 200 mT.

8. A ferrite core according to claim 1 wherein increase in the core loss is up to 4% when stored at 150° C. for 2000 hours.

9. A ferrite core according to claim 1 wherein increase in the core loss is up to 3% when stored at 150° C. for 2000 hours.

10. A ferrite core according to claim 1 wherein increase in the core loss is up to 10% when stored at 175° C. for 2000 hours.

11. A ferrite core according to claim 1 wherein increase in the core loss is up to 50% when stored at 200° C. for 2000 hours.

12. A method for producing the ferrite core of claim 1 comprising the step of firing a molded article, wherein
the firing step comprises heating stage, steady temperature stage, and cooling stage in this order, and
the article is kept in the steady temperature stage at a temperature (steady temperature) of at least 1250° C. with the oxygen concentration of the atmosphere kept at 0.05 to 2.0%.

13. A method for producing the ferrite core according to claim 12 wherein the oxygen concentration of the atmosphere in the steady temperature stage is kept at 0.05 to 0.8%.

14. A method for producing the ferrite core according to claim 12 wherein the temperature (steady temperature) in the steady temperature stage is up to 1400° C.

15. A method for producing a ferrite core according to claim 12 wherein the cooling stage is accomplished such that,
when a specific temperature in 900 to 1200° C. is designated Tn, and when the temperature is reduced from the steady temperature to the temperature Tn,
the oxygen concentration $P_{O_2}$ (unit: %) of the atmosphere at temperature T (unit: K) is either gradually or incrementally reduced to satisfy the relation:

$$Log(P_{O_2})=a-b/T$$

wherein a is 3 to 14, and b is 5000 to 23000, provided that a and b may or may not alter with the decrease in the temperature T;
when the temperature reaches Tn, the oxygen concentration of the atmosphere is reduced to the level of 0 to 0.01%; and
the temperature is reduced from Tn to the room temperature at a cooling rate which is 2 to 10 times faster than the cooling rate used in the cooling from the steady temperature to the temperature Tn.

16. A method for producing a ferrite core according to claim 15 wherein the temperature is reduced from the steady temperature to the temperature Tn at a cooling rate of 20 to 200° C./hr.

17. A method for producing a ferrite core according to claim 12 wherein, in the temperature range of 900° C. to the steady temperature in the heating stage, the oxygen concentration in the atmosphere is maintained to 10% or less, and the heating rate is maintained to 50 to 300° C./hr.

* * * * *